US009386210B2

(12) United States Patent
Kawashima (10) Patent No.: US 9,386,210 B2
(45) Date of Patent: Jul. 5, 2016

(54) IMAGING APPARATUS (75) Inventor: Miyoko Kawashima, Haga-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1154 days.

(21) Appl. No.: 13/416,456

(22) Filed: Mar. 9, 2012

(65) Prior Publication Data

US 2012/0236137 A1    Sep. 20, 2012

(30) Foreign Application Priority Data

Mar. 18, 2011    (JP) ................. 2011-060183

(51) Int. Cl.
G02B 21/00 (2006.01)
H04N 5/225 (2006.01)
G02B 5/00 (2006.01)
G02B 21/36 (2006.01)
G02B 27/58 (2006.01)
H04N 5/238 (2006.01)

(52) U.S. Cl.
CPC .............. H04N 5/2258 (2013.01); G02B 5/005 (2013.01); G02B 21/36 (2013.01); G02B 27/58 (2013.01); H04N 5/2254 (2013.01); H04N 5/2256 (2013.01); H04N 5/238 (2013.01)

(58) Field of Classification Search
CPC .................................................. G02B 21/004
USPC .......................................................... 348/79
See application file for complete search history.

(56) References Cited

U.S. PATENT DOCUMENTS

| 2002/0186976 A1* | 12/2002 | Seo .................... G03B 17/48 396/429 |
| 2003/0128366 A1* | 7/2003 | Deason ................. G01B 9/04 356/502 |
| 2003/0139886 A1* | 7/2003 | Bodzin .................. G01N 21/47 702/28 |
| 2006/0049348 A1* | 3/2006 | Petrov ................ G01N 23/2204 250/307 |
| 2006/0176457 A1* | 8/2006 | Ishii .................. G01M 11/0214 355/53 |
| 2007/0188650 A1 | 8/2007 | Kobayashi et al. |
| 2008/0259197 A1* | 10/2008 | Ito .......................... H04N 5/243 348/311 |
| 2009/0168155 A1* | 7/2009 | Matsui .................. G02B 21/14 359/368 |
| 2010/0145416 A1* | 6/2010 | Kang .................. A61B 5/0059 607/89 |

FOREIGN PATENT DOCUMENTS

| JP | 05168596 A | 7/1993 |
| JP | 9281405 A | 10/1997 |
| JP | 2007221386 A | 8/2007 |
| JP | 2008298861 A | 12/2008 |
| JP | 2009003016 A | 1/2009 |
| JP | 2011008000 A | 1/2011 |

OTHER PUBLICATIONS

Japanese Office Action dated Sep. 2, 2014 issued in corresponding Japanese Application No. JP2011-060183.

* cited by examiner

Primary Examiner — Jeffery Williams
(74) Attorney, Agent, or Firm — Rossi, Kimms & McDowell LLP (57) ABSTRACT An imaging apparatus includes an imaging optical system configured to form an optical image of an object, a first imaging sensor device, a second imaging sensor device having an integration degree smaller than that of the first imaging sensor, and a controller configured to execute a first imaging mode in which the first imaging sensor device is used for image pickup of the object while the first imaging sensor device is located at an image plane of the imaging optical system, and a second imaging mode in which the second imaging sensor device is used for image pickup of the object while the second imaging sensor device is located at the image plane of the imaging optical system.

14 Claims, 11 Drawing Sheets

FIG. 13D

IMAGING APPARATUS

BACKGROUND OF THE INVENTION

1. Field of the Invention

The present invention relates to an imaging apparatus.

2. Description of the Related Art

In order to observe a sample (test object) using a microscope with a different resolution, Japanese Patent Laid-Open No. ("JP") 09-281405 proposes a method for obtaining an overall sample image by exchanging an objective lens to change its magnification, and by connecting imaging information in a small view (optical field of view). JP 2009-003016 proposes a method for providing fast and global image pickup by using a high-resolution objective lens having a wide field and by arranging a plurality of imaging sensor devices in an imaging unit.

However, the method disclosed in JP 09-281405 requires many objective lenses so as to meet a demand for a variety of resolutions. The method disclosed in JP 2009-003016 causes an excessively high integration degree when a low-resolution image of the overall sample is formed on a device which is over sampling using an optical system dedicated for a wide angle and a high resolution. The excessively high integration degree of the imaging sensor results in a larger storage capacity, a longer time for image processing or an image transmission, and an increased cost.

When a multicolored imaging sensor device having a Bayer arrangement is used to obtain a multicolored image, light from an light source is divided into light fluxes of three types of wavelengths and received by three types of pixels. Hence, the number of devices for receiving the same wavelength is halved or quartered. Therefore, the same resolution cannot be maintained without making the pixel number in the multicolored imaging sensor device twice or four times as many as that of the monochromatic imaging sensor device.

On the other hand, as the number of pixels in the imaging sensor device increases, the device has a finer structure, thus a manufacture of the imaging sensor device becomes more difficult, and the noises increase.

SUMMARY OF THE INVENTION

The present invention provides an imaging apparatus configured to quickly provide image pickup with a variety of resolutions and an appropriate image data amount without exchanging an imaging optical system.

An imaging apparatus according to the present invention includes an imaging optical system configured to form an optical image of an object, a first imaging sensor device, a second imaging sensor device having an integration degree smaller than that of the first imaging sensor, and a controller configured to execute a first imaging mode in which the first imaging sensor device is used to take an image of the object while the first imaging sensor device is located at an image plane of the imaging optical system, and a second imaging mode in which the second imaging sensor device is used to take an image of the object while the second imaging sensor device is located at the image plane of the imaging optical system.

Further features of the present invention will become apparent from the following description of exemplary embodiments with reference to the attached drawings.

DESCRIPTION OF THE EMBODIMENTS

Figure 1:
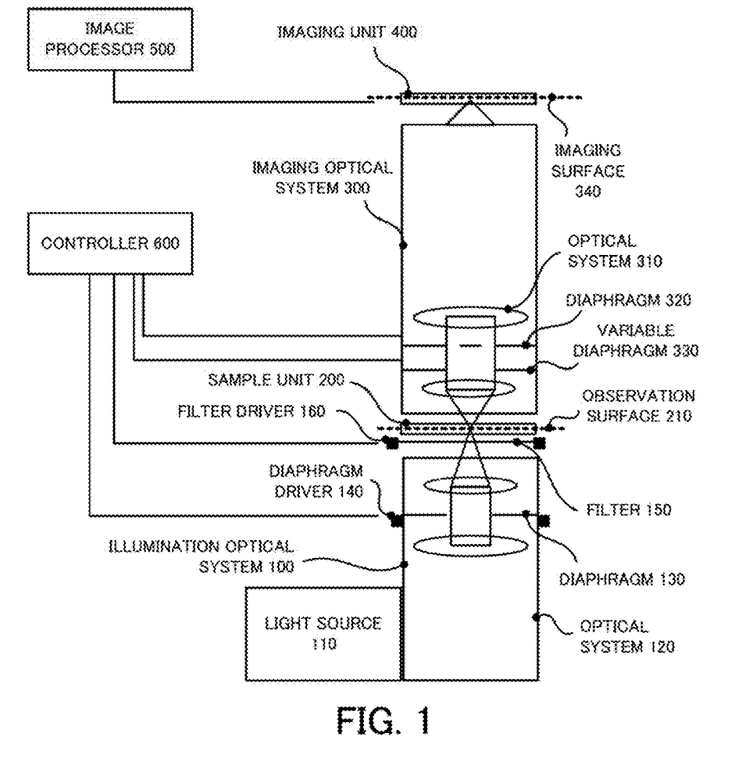
FIG. 1 is a view that illustrates a structure of an imaging apparatus according to first, second, third and fourth embodiments.

FIG. 1 is a block diagram of an imaging apparatus that includes a microscope according to this embodiment. The imaging apparatus includes an illumination optical system 100, a sample unit 200, an imaging optical system 300, an imaging sensor device (imaging unit) 400, an image processor 500, and a controller 600.

The illumination optical system 100 includes a light source unit 110, an optical system 120, a diaphragm 130 arranged near a pupil position, and a filter 150 arranged at a position near the observation surface 210 or at a position conjugate with the observation surface 210. The illumination optical system 100 is configured to guide light from a light source unit 110 to an observation surface 210.

The light source unit 110 includes one or more of halogen lamps, xenon lamp, LED, etc. configured to illuminate a sample. The diaphragm 130 is arranged on a diaphragm driver 140 configured to switch or exchange the diaphragm 130. As described later, the diaphragm 130 can serve to enable the light that has transmitted through an object to reach one imaging sensor device in the imaging sensor device unit 400. The filter 150 is configured to change its filter position or configured switchable or exchangeable by the filter driver 160.

The sample unit 200 is mounted with a sample, and includes a sample stage (movable stage) (not illustrated) and a sample holder (not illustrated). The sample stage can move the sample holder in a direction parallel to the optical axis of the imaging optical system 300 and a direction perpendicular to the optical axis within a plane perpendicular to the optical axis or in a direction oblique to the optical axis. The sample stage is driven so that the sample as an object can accord with the observation surface 210, and an image is taken using the illumination optical system 100, the imaging optical system 300, and the imaging unit 400.

The imaging optical system 300 forms, on an imaging surface 340, an optical image of the sample illuminated on the observation surface 210, and includes an optical system 310, a diaphragm 320 arranged near the pupil position, and a variable diaphragm 330. A diaphragm 320 is a aperture stop. A diaphragm 330 is a center shield stop. The variable diaphragm 330 is located near the pupil position or at a position in the optical path which is suitable for an insertion. The imaging optical system 300 may be a transmissive or reflective optical system.

The imaging unit 400 includes a stage (not illustrated) configured to arrange an imaging sensor device on the image plane of the imaging optical system 300, a substrate 410, and the imaging sensor device 420. This stage places, for example, an imaging sensor device 1 on the image plane of the imaging optical system when a high resolution mode is selected, and an imaging sensor device 2 on the image plane of the imaging optical system when a global imaging mode is selected.

As illustrated in FIG. 2A, 3A, 4A, 5A, or 6A, the imaging sensor device 420 includes two or more types of imaging sensor devices arranged on the substrate 410 with spaces. The first imaging sensor device (imaging sensor device 1), the second imaging sensor device (imaging sensor device 2), etc. are arranged on the imaging plane of the imaging optical system 300. The imaging device 420 will be described in detail later.

On the imaging surface 340, the stage is driven so that the imaging sensor device 420 enters the field of the optical system 310. The light received by the imaging sensor device 420 is photoelectrically converted into an electric signal.

The image processor 500 temporarily stores the electric signal from the imaging sensor device 420 of the imaging unit 400 in a storage unit (not illustrated), and performs image processing including image synthesizing for it. In the image processing, an image of the object is taken division image by moving the imaging sensor device 1 or 2 by the controller 600, and the whole image is obtained by connecting images obtained through the division image pickups.

The controller 600 controls an operation of the imaging apparatus, in particular, driving of the diaphragm driver 140 and the filter driver 160, exchanging or switching of the diaphragm 130 or filter 150, driving of the variable stop 330 and the sample stage or the stage configured to move the imaging sensor device. These components switch the imaging sensor device 1 and 2 to each other (that) configured to receive the light from the imaging optical system, between the two imaging modes.

The imaging apparatus can execute a plurality of imaging modes, and provide image pickup with a different resolution corresponding to the imaging condition in accordance with the set imaging mode without exchanging the imaging optical system (or while the structure of the imaging optical system is maintained).

These imaging modes include, for example, a high resolution mode (first imaging mode) that emphasizes a resolving power, a global imaging mode (second imaging mode) that is used to obtain a wide area image without using a high resolving power, and a measurement mode (third imaging mode) that requires few resolving powers. The controller 600 can execute each imaging mode. An approximately overall size of the sample or a position of the sample in the optical axis direction is measured in the measurement mode.

Figure 2A:
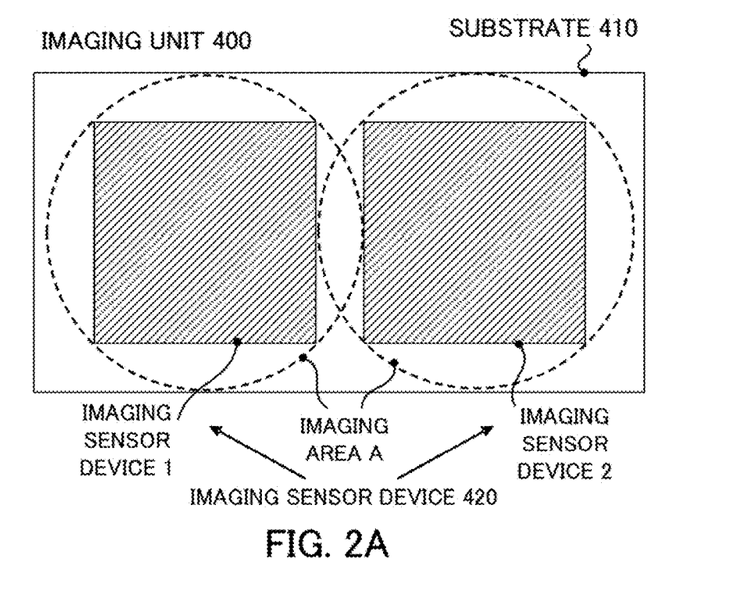
FIGS. 2A-2B are views that illustrate structures of an imaging unit and a diaphragm of an illumination optical system illustrated in FIG. 1 according to the first and second embodiments.

The imaging sensor device 420 includes two types or more of different imaging sensor devices, as illustrated in FIG. 2A. Each imaging sensor device is different, for example, in pixel pitch or integration degree. Alternatively, one imaging sensor device includes pixels with color-filter or another imaging sensor device includes monochromatic pixels. The color filters in the imaging sensor unit may be arranged in the Bayer arrangement.

In the high resolution mode, the imaging sensor device 1 having a high integration degree is placed on the imaging plane of the imaging optical system, and used to take an image of the object. In the global imaging mode, the imaging sensor device 2 having a low integration degree is placed on the imaging plane of the imaging optical system, and used to take an image of the object. Alternatively, the imaging sensor device 1 that includes monochromatic pixels is used for the high resolution mode, and the imaging sensor device 2 that includes pixels with color-filter is used for the global imaging mode. The measurement mode uses an imaging sensor device 3 that includes monochromatic pixels or that includes pixels with color-filter. Sensor device 2 or 3 consists of monochromatic pixels which has a smaller integration degree than that of the first imaging sensor device 1. Sensor device 3 may be a smaller integration degree than that of the imaging sensor device 2. Or these consist of pixels with color-filter which has an integration degree equal to or lower than that of the imaging sensor device 1.

The imaging sensor device that includes pixels with color-filter takes in light having a different wavelength for each imaging sensor device, and images are synthesized into a multicolored image through image processing.

When the multicolored image is acquired from the monochromatic image, a monochromatic image is obtained by inserting a color filter at an arbitrary position between the light source 110 as a white light source and the imaging sensor device 420, and by receiving the light for each wavelength. For example, the imaging sensor unit 420 receives light of only the short wavelength (with a central wavelength of about 450 nm) by inserting a filter through which the short wavelength (with the central wavelength of about 450 nm) can pass. Similarly, the light fluxes of two wavelengths, such as the intermediate wavelength (with the central wavelength of about 550 nm) and the long wavelength (with the central wavelength of about 650 nm), are separately received. The received signal is transmitted as a monochromatic image and stored in the memory in the image processor. These monochromatic images are synthesized through image processing, and converted into a multicolored image. Alternatively, the sample is illuminated by monochromatic light sources having different wavelengths, reflected light fluxes or transmitting light fluxes from the sample are separately received, and these monochromatic images are similarly synthesized through image processing and converted into the multicolored image.

The pixel pitch related to the integration degree of the imaging sensor device 420 may be determined so that the cutoff frequency of the MTF of the imaging sensor device 420 (or the minimum frequency at which the MTF becomes 0) is higher than that of the optical system. Then, the resolving performance of the imaging optical system 300 can be maximized.

Even When a higher resolving power is required to obtain a multicolored image, the monochromatic imaging sensor device is advantageous. This is because when the monochromatic imaging sensor device is used, a pixel pitch for each color can be reduced.

When p denotes a pixel pitch of an imaging sensor device, rc denotes a cutoff frequency, and R denotes a conceivable resolving power, the pixel pitch p can be determined from the sampling theorem. As in the following expression, the pixel pitch of the imaging sensor device needs to be smaller than R.

$$p \le \frac{1}{2rc} = R \qquad \text{Expression 1}$$

An image is taken with a fine pixel pitch for the high resolution mode, so as not to damage the resolution of the optical system 310. The cutoff frequency is made equal to the limit of the resolving power of the imaging optical system 300. The limit of the resolving power of the imaging optical system 300 is determined by an imaging magnification M of the imaging optical system 300, a wavelength λ of illumination light, a numerical aperture NA of an objective lens of an imaging sensor device, and a coherence factor σ of the illumination optical system 100.

The imaging sensor device 1 having this imaging pitch is used by finding the imaging pitch using Expression 1 and R as the limit of the resolving power of the imaging optical system 300. An image of a relatively narrow area is observed in the high resolution mode so as to reduce the memory capacity.

In the global imaging mode, the limit of the resolving power of the imaging optical system 300 is changed because an image of the object is taken by making the numerical aperture smaller than the high resolution mode. The imaging sensor device 2 is used, which has a pixel pitch that is determined by the critical resolving power R that relies upon the numerical aperture NA of the imaging optical system 300.

In the measurement mode, the NA is further reduced, and the imaging sensor device 3 having a pixel pitch which is determined by the necessary resolving power is used.

In order to take the sample's overall image in the global imaging mode or measurement mode, the image area can be enlarged. Thus an image is formed for one image pickup area of the imaging sensor device, then an image is sequentially taken after the imaging sensor device is moved to the neighboring area. The one image pickup area of the imaging sensor device is determined by the field of the objective lens.

Figure 9:
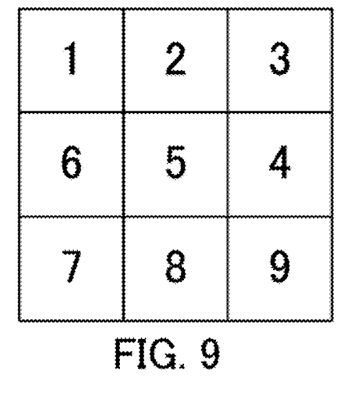
FIG. 9 is a view for explaining an image of a large area according to the first, second, third and fourth embodiments.

For example, FIG. 9 illustrates rectangles each of which corresponds to one image pickup area of the imaging sensor device. After an image is taken at a "1" position, the sample position or the imaging sensor device position is relatively shifted, and an image is taken at "2", "3", . . . "9" positions sequentially. Then, these images are connected, and a whole image can be obtained.

As an image becomes wider, the number of pixels increases. Then, as the number of pixels increases, the storage capacity of the image data increases and the data transmission time requires a longer time. Nevertheless, when the imaging sensor device 2 having a low integration degree is used, the number of pixels of a wide image can be not extremely numerous.

First Embodiment

In the imaging apparatus illustrated in FIG. 1, a light flux from the illumination optical system 100 is irradiated by a numerical aperture NAi and enters the imaging optical system (objective lens) 300 with a numerical aperture NA. The NA ratio is referred to as a coherence factor σ (=NAi/NA). The numerical aperture of the objective lens is NA=0.75, and the magnification M is 10. The numerical aperture of the illumination optical system is NA=0.525, and σ=0.7. The white light source having a central wavelength of 550 nm is used.

The imaging sensor device 1 is used for the high resolution mode. Since the critical resolving power of the imaging optical system 300 is R=2.2 (μm), the pixel pitch P of the imaging sensor device 1 becomes P≤2.2 (μm) from Expression 1. The imaging sensor device 1 includes monochromatic pixels having a pixel pitch of 2.2 μm.

The imaging sensor device 2 is used for the global imaging mode, and the numerical aperture of the objective lens is reduced, for example, to NA=0.45. Since the numerical aperture NAi of the illumination optical system 100 is 0.525, σ (=NAi/NA)≥1 is changed but the numerical aperture NAi of the illumination optical system is reduced to 0.45 so that σ becomes 1. A method for reducing the numerical apertures of the objective lens and the illumination optical system 100 will be described later in detail in a fourth embodiment. The critical resolving power of the imaging optical system 300 is R=3.1 (μm) when numerical aperture NA is NA-0.45. The pixel pitch P of the imaging sensor device 2 becomes P≤3.1 (μm) in view of Expression 1. The imaging sensor device 2 includes monochromatic pixels having a pixel pitch P=3.1 (μm) or smaller.

The imaging sensor device 3 is used for the measurement mode, and the numerical aperture of the objective lens is reduced, for example, to NA=0.4. When the resolving power necessary for the measurement mode is set to 10 μm, and the pixel pitch P of the imaging sensor device 3 is set to P=10 (μm) in view of Expression 1. The imaging sensor device 3 includes monochromatic pixels having a pixel pitch P=10 (μm) or smaller. Alternatively, the imaging sensor device 2 may be used in this mode.

In the high resolution mode even when a multicolored image is necessary, the monochromatic imaging sensor device is used. This is because the pixel pitch of the color-filter attached imaging sensor device needs to be made smaller than this size, the noises increase, and the performance of the imaging sensor device is lowered.

When a multicolored image is taken by the monochromatic imaging sensor device, the transmitting wavelength region is replaced with the filters 150 of the long wavelength side R (so that the red light can transmit it), the intermediate wavelength G (so that the green light can transmit it), and the short wavelength side B (so that the blue light can transmit it), and an image is sequentially taken.

Alternatively, the light source 110 may be replaced with the RGB light sources having different wavelengths and images may be sequentially taken. Three-color images are taken separately and synthesized (united) into one multicolored image.

The imaging sensor devices 1 and 2 of the imaging sensor device 420 are arranged on the substrate 410, as illustrated in FIG. 2A. Alternatively, one of the imaging sensor devices 1 and 2 may be arranged on the substrate 410, and may be replaced and used. The shapes and sizes of the imaging sensor devices 1 and 2 may be different.

Figure 2B:
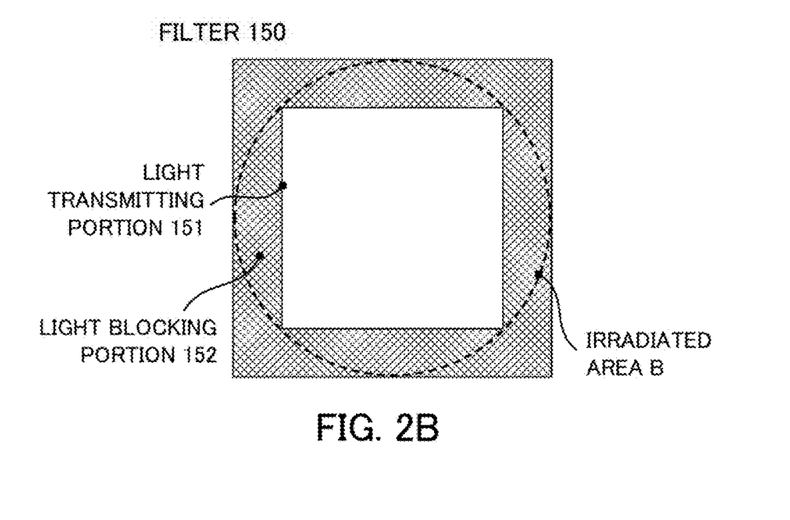

The filter 150 of the illumination optical system 100 includes, as illustrated in FIG. 2B, a light transmitting portion 151, and a light blocking portion 152. The light transmitting portion 151 may include a color filter configured to transmit light of a certain wavelength region. In accordance with the shape of the imaging sensor device, the light that has transmitted through the sample is allowed to selectively reach one imaging sensor device.

When the imaging sensor device 1 is sufficiently distant from the imaging sensor device 2 so that their imaging areas do not overlap each other, or when the imaging sensor devices 1 and 2 are exchanged and used, the filter 150 may include only the light transmitting area 151. When a monochromatic image is taken, no filter 150 is necessary.

The imaging sensor device illustrated in FIG. 2A is moved so that the imaging area A of the imaging optical system 300 overlaps the imaging surface of the imaging sensor device 1 or 2 in accordance with the imaging mode. The imaging sensor device 1 is used but the imaging sensor device 2 is not used to take an image in the high resolution mode. Therefore, the filter 150 is moved or selected so that the light from the illumination optical system 100 selectively reaches the imaging sensor device 1. The filter is moved or selected in another mode so that the illumination light can selectively reach a corresponding imaging sensor device.

While the description of the imaging sensor device 3 is omitted in the above description, it is similar to the imaging sensor device 2. An additional imaging sensor device may be provided in accordance with the necessary resolution.

Second Embodiment

In the imaging apparatus illustrated in FIG. 1, the numerical aperture of the objective lens is NA=0.75, and the magnification M is 10. The numerical aperture of the illumination optical system is NA=0.525, and σ=0.7. The white light source having a central wavelength of 550 nm is used.

The imaging sensor device 1 is used for the high resolution mode. Since the critical resolving power of the imaging optical system 300 is R=2.2 (μm), the pixel pitch P of the imaging sensor device 1 becomes P≤2.2 (μm) in view of Expression 1. The imaging sensor device 1 includes monochromatic pixels having a pixel pitch of 2.2 μm.

The imaging sensor device 2 is used for the global imaging mode, and the numerical aperture of the objective lens is reduced, for example, to NA=0.45. The numerical aperture NAi of the illumination optical system is reduced so as to set σ to 1. The method for reducing the numerical apertures of the objective lens and the illumination optical system 100 will be described in detail later in the fourth embodiment. The critical resolving power of the imaging optical system 300 is R=3.1 (μm).

The imaging sensor device 2 uses an imaging sensor device having color filters that are arranged in the Bayer arrangement with the same pixel pitch P=2.2 μm as that of the imaging sensor device 1. A pitch between the pixels is 2.2×√2=3.11 for the pixels with color-filter of the intermediate wavelength G (in which the green light is allowed to transmit), and satisfies the relationship of Expression 1.

The imaging sensor device 3 uses an imaging sensor device having color filters that are arranged in the Bayer arrangement with a pixel pitch P=7 μm, and is used for the measurement mode. Alternatively, the imaging sensor device 2 may be used for this mode.

Since the global imaging mode or the measurement mode does not require a high resolution, a comparatively large pixel pitch can be used and thus the imaging sensor device of the Bayer arrangement can be used in which the pixel pitch is large for the integration degree is the same.

The imaging sensor devices 1 and 2 of the imaging sensor device 420 are arranged, as illustrated in FIG. 2A, on the substrate 410. Alternatively, one of the imaging sensor devices 1 and 2 may be arranged on the substrate 410, and may be replaced and used. The shapes and sizes of the imaging sensor devices 1 and 2 may be different.

The filter 150 of the illumination optical system 100 includes, as illustrated in FIG. 2B, a light transmitting portion 151, and a light blocking portion 152. The light transmitting portion 151 may include a color filter configured to transmit light of a certain wavelength region. In accordance with the shape of the imaging sensor device, the light that transmits through the sample is allowed to selectively reach one imaging sensor device.

When the imaging sensor device 1 is sufficiently distant from the imaging sensor device 2 so that their imaging areas do not overlap each other, or when the imaging sensor devices 1 and 2 are exchanged and used, the filter 150 may include one the light transmitting area 151. When a monochromatic image is taken, no filter 150 is necessary.

The imaging sensor device illustrated in FIG. 2A is moved so that the imaging area A of the imaging optical system 300 overlaps the imaging surface of the imaging sensor device 1 or 2 in accordance with the imaging mode. The imaging sensor device 1 is used but the imaging sensor device 2 is not used for image pickup in the high resolution mode. Therefore, the filter 150 is moved or selected so that the light from the illumination optical system 100 selectively reaches the imaging sensor device 1. The filter is moved or exchanged in another mode so that the illumination light can selectively reach a corresponding imaging sensor device.

While the description of the imaging sensor device 3 is omitted in the above description, it is similar to the imaging sensor device 2. An additional imaging sensor device may be provided in accordance with the necessary resolution.

Third Embodiment

Figure 3A:
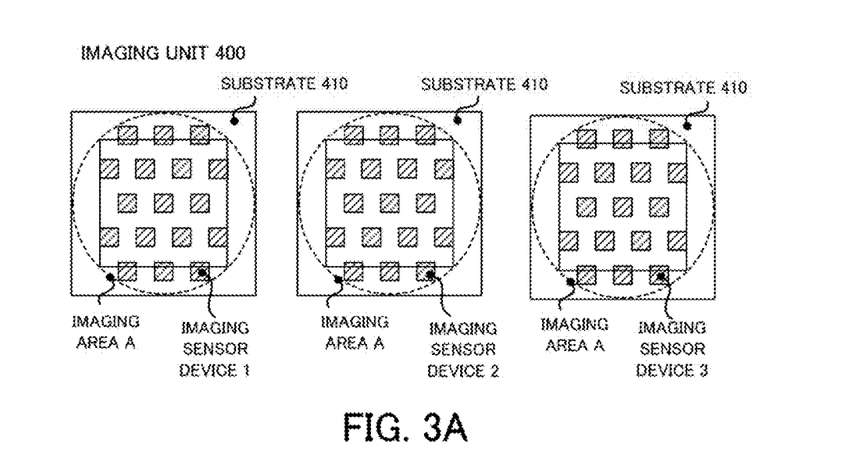
FIGS. 3A-3B are views that illustrates other structures of the imaging unit and the diaphragm of the illumination optical system illustrated in FIG. 1 according to the third embodiment.
Figure 3B:
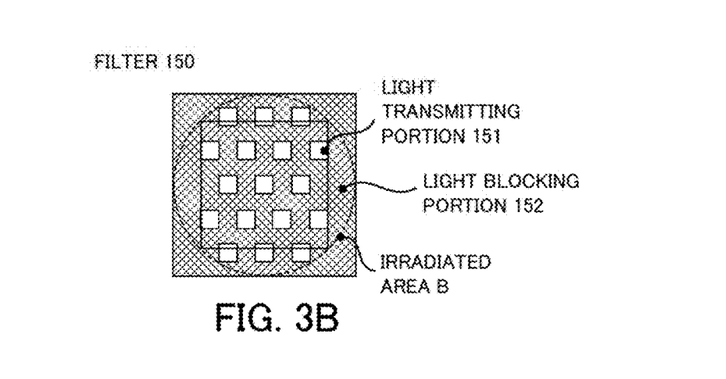

In the imaging apparatus illustrated in FIG. 1, the imaging optical system 300 has a high magnification and/or a wide angle of view, and the imaging area A of the optical system 310 is much larger than that of one imaging sensor device. There are a plurality of imaging sensor devices 1, a plurality of imaging sensor devices 2, and a plurality of imaging sensor devices 3, as illustrated in FIG. 3A. The filter 150 that limits an irradiated area B includes a light transmitting portion 151 and a light blocking portion 152, as illustrated in FIG. 3B. The light transmitting portion 151 may be a color filter that allows the light of a certain wavelength region to transmit through it.

Figure 4A:
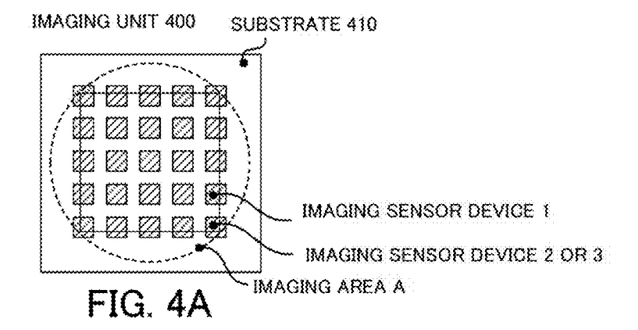
FIGS. 4A-4C are views that illustrates other structures of the imaging unit and the diaphragm of the illumination optical system illustrated in FIG. 1 according to the third embodiment.
Figure 4B:
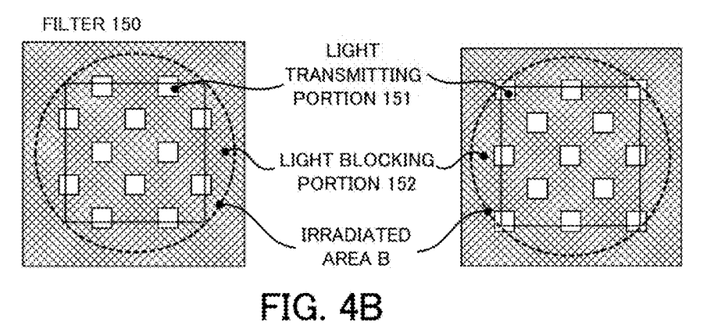
Figure 7:
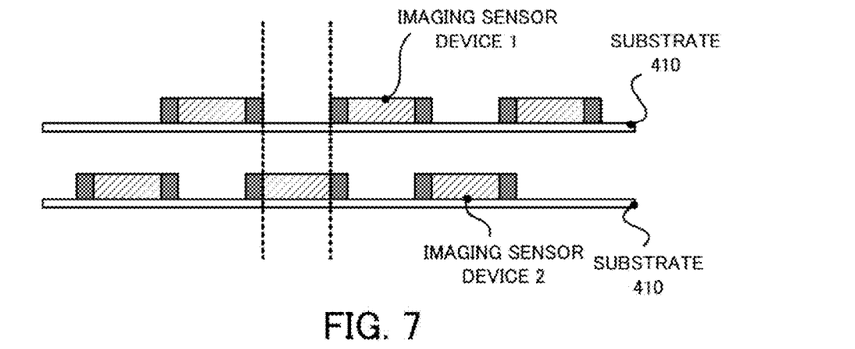
FIG. 7 is a view that illustrates another structure of the imaging unit illustrated in FIG. 1 according to the third embodiment.

As illustrated in FIG. 4A, the imaging unit may include a plurality of imaging sensor devices 1 and 2 arranged next to each other. Alternatively, the two imaging sensor devices illustrated in FIG. 3A may be piled through the substrates 410 that are made of light transmitting materials, as illustrated in FIG. 7, so as to provide the positional relationship illustrated in FIG. 4A. In this case, the surface of each imaging sensor device accords with the in-focus position and an image is taken by changing a focus position.

Figure 5A:
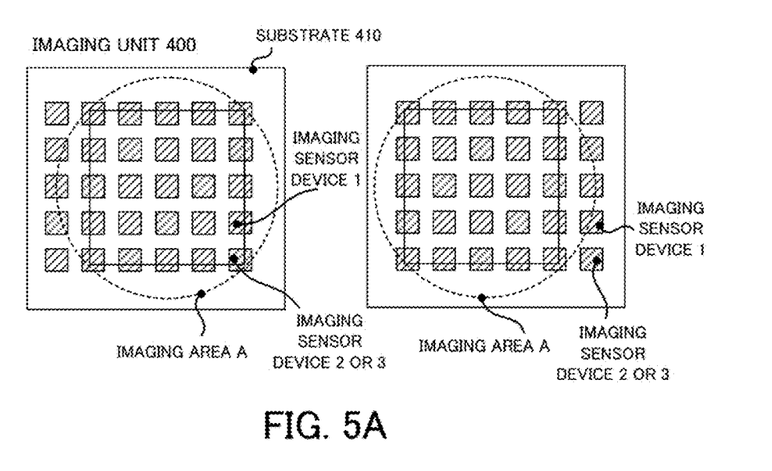
FIGS. 5A-5B are views that illustrates other structures of the imaging unit and the diaphragm of the illumination optical system illustrated in FIG. 1 according to the third embodiment.
Figure 6A:
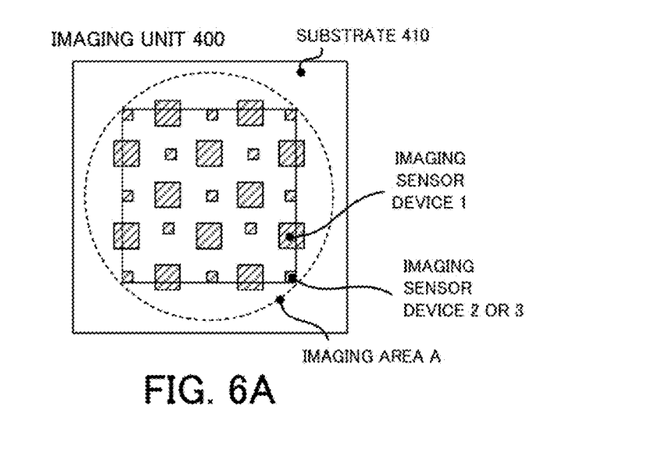
FIGS. 6A-6B are views that illustrates other structures of the imaging unit and the diaphragm of the illumination optical system illustrated in FIG. 1 according to the third embodiment.
Figure 6B:
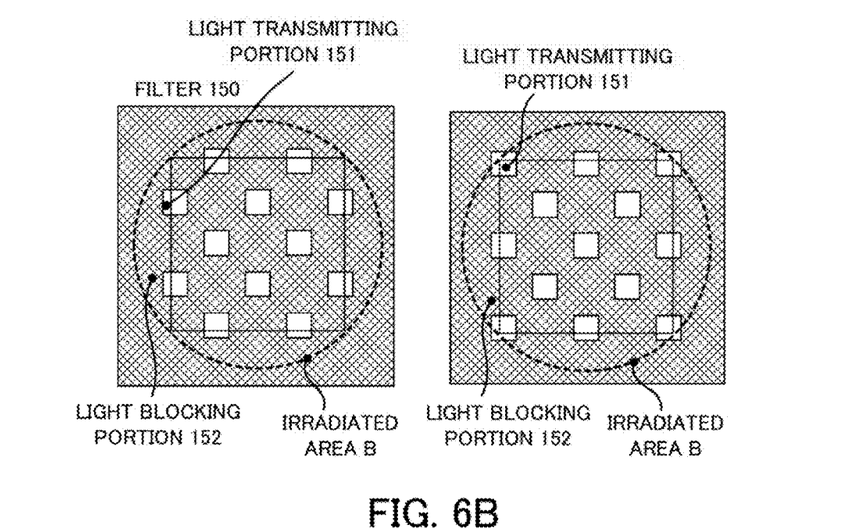

In the imaging sensor device illustrated in FIG. 4A, 5A, or 6A, the imaging sensor device 2 and the imaging sensor device 3 have the same structure. The imaging sensor device 1 may be different in shape or size from the imaging sensor device 2 (FIG. 6A). If possible, the imaging sensor device may be arranged on a plane.

Similar to the first embodiment, the filter or imaging sensor device is moved so that the imaging area of the optical system can overlap the imaging sensor device 1 or 2 (or 3) in accordance with the imaging mode (FIGS. 3A and 3B or 4A and 4B).

Figure 4C:
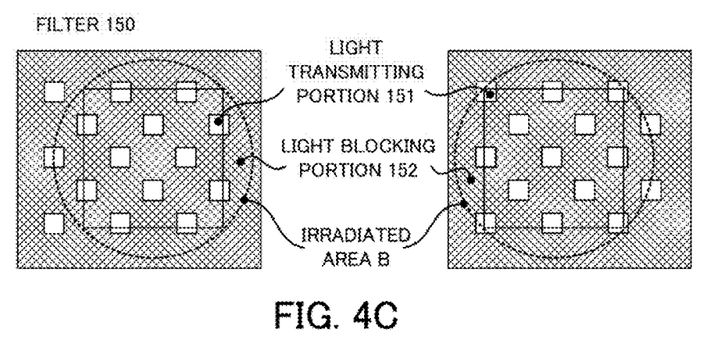

When another imaging sensing device 1 is used but another imaging sensing device is not used to take an image, similar to the first embodiment, the filter 150 is selected (FIG. 3B or 4B) or moved (FIG. 4C) so that the light that has transmitted through the sample can selectively reach only the imaging sensor device 1. When the imaging sensor device illustrated in FIG. 3A is used, the filter 150 may be fixed. It may be exchanged with a color filter that has the same positional relationship of the light transmitting portion 151.

Figure 5B:
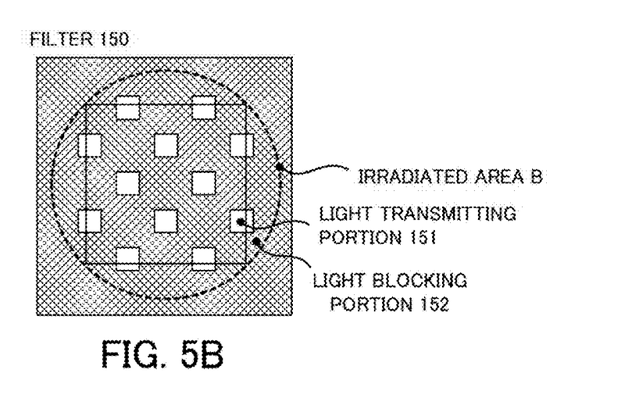

Alternatively, the imaging sensor device is moved so that the imaging area A of the optical system 310 overlaps many of the imaging sensor devices 1 or 2 (or 3) in accordance with the imaging mode (FIG. 5A). In this case, the filter 150 may be fixed. It may be exchanged with a color filter that has the same positional relationship of the light transmitting portion 151 (FIG. 5B).

The filter 150 may be inserted into an arbitrary position in the optical path between the light source and the imaging unit.

After a measurement in the measurement mode ends, an image is taken in the high resolution mode or the global imaging mode.

In the measurement mode, the numerical aperture of the objective lens is reduced, for example, to NA=0.4, and the imaging sensor device 3 is used. A pixel pitch P of the imaging sensor device 3 is 7 μm, and the imaging sensor device 3 includes color filters that are arranged in the Bayer arrangement. The light source 110 uses a white light source.

In the measurement mode, a three-dimensional position in which a sample exists is roughly measured. Even when the imaging sensor device 3 illustrated in FIG. 3A or 4A is used to take an image at discrete positions with respect to the imaging area, a rough two-dimensional size can be recognized.

Through image pickups a plurality of times by changing focus positions in the depth (z) direction, a coordinate at a representative two-dimensional (x, y) position in the optical axis direction is measured and the focal position is estimated. Thus, the "measurement" is an acquisition of rough three-dimensional positional information in which the sample exists through a predetermined procedure by taking and obtaining an image of the sample.

A focus position is a position in the z direction in which each portion of the taken image has a good contrast. In general, since a slide glass or preparation undulates and a thickness of the sample scatters, the best focus positions are not constant at (x, y) positions. Through image pickups a plurality of times by changing the focus position in the depth (z) direction, a good contrast position in the z direction at the (x, y) position is set to the focus position.

In order to improve the precision of the focus position, the focus position may be measured by changing a low NA to a high NA that allows a narrow depth of focus. In addition, image pickups are performed a plurality of times by shifting the sample position relative to the imaging sensor device, a plurality of obtained images are synthesized, and the focus position may be measured thoroughly over the imaging area. As illustrated in FIG. 9, the imaging sensor device and the sample may be shifted relative to each other, the measurement is repeated a plurality of times, and a focus position may be measured in a wider area. The measurement mode may be omitted if another means has already obtained three-dimensional positional information in which the sample exists.

Alternatively, the image obtained in the measurement mode may be used to calculate parameters necessary for image pickup, such as a boundary of the sample using light and shade information and chromatic distribution information.

Next, an image is taken in the global imaging mode. The imaging sensor device 2 is used for the global imaging mode, and the numerical aperture of the objective lens is reduced, for example, to NA=0.45. When the maximum numerical aperture NAi of the illumination optical system 100 is 0.525, σ(=NAi/NA) ≥1 but σ is set to 1. The imaging sensor devices 2 and 3 may have the same structure.

In the global imaging mode, the imaging optical system 300 and the sample are arranged at the obtained best focus position and an image is taken. The "best focus position" may be an average position of the focus positions of each device over the sample, or an image is taken a plurality of times at a focus position of each device and the image portions at the best focus positions may be connected.

Alternatively, a position of the observation surface 210 of the imaging optical system 300 or the imaging unit 400 is adjusted so that a plurality of imaging sensor devices can be located at the best focus positions. Images are taken by shifting the sample position relative to the imaging sensor device so that it overlaps the imaging area of the optical system and spaces between the imaging sensor devices are eliminated. A plurality of obtained images is synthesized into one image of the overall imaging area of the optical system 310.

Figures 8A, 8B:
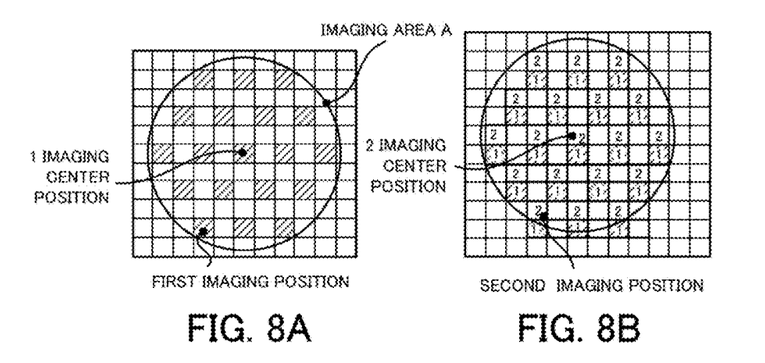
FIGS. 8A-8D are views for explaining an acquisition of an image of one area.
Figure 8C:
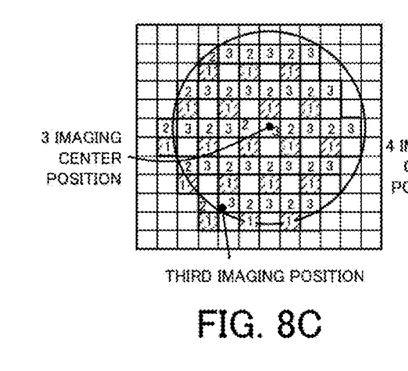
Figure 8D:
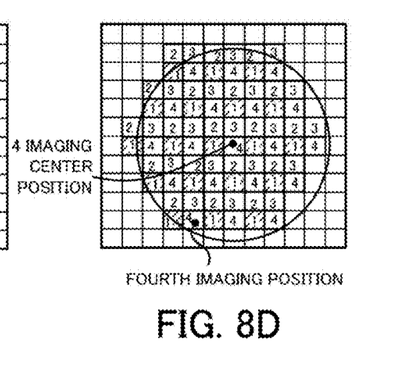

FIGS. 8A to 8D illustrate this state. As illustrated in FIG. 8A, for example, the imaging sensor device illustrated in FIG. 3A is used, and after the first image pickup, image data is obtained. In FIG. 8A, "1" imaging center position denotes a central position of the first image pickup, and a hatched portion denotes an image area obtainable in the first image pickup. Next, as illustrated in FIG. 8B, the image pickup central position is shifted in the field of the optical system, and the second image pickup follows so as to fill the space around the first image pickup. As illustrated, "2" imaging center position denotes a central position of the second image pickup, and "2" labeled square denotes an image area obtainable in the second image pickup. Similarly, as illustrated in FIGS. 8C and 8D, third and fourth images are taken and the image data is obtained. Finally, "1," "2," "3," and "4" labeled square areas are taken, and a consecutive image is formed by connecting these images through image processing.

When two-dimensional size information of the previously obtained sample is larger than the field of the optical system, the field position of the optical system may be changed to obtain a wider image. In other words, as illustrated in FIG. 9, the imaging sensor device and the sample are shifted relative to each other by changing a field position of the optical system, so as to move to the position next to the previously taken imaging area. Thereafter, an overall image of the next imaging area is obtained in accordance with the procedure illustrated in FIGS. 8A-8D, and a global image is obtained by connecting these image portions. In the global imaging mode, a reduction of the NA provides an additional effect of increasing a depth of focus, and it becomes easy to obtain a focused image in the wider area. In addition, the number of pixels in the imaging sensor device does not become unnecessarily excessive, and thus an increase of the memory capacity can be restrained within a necessary amount even in the wide area.

Next, an image is taken in the high resolution mode. The numerical aperture of the high resolution mode is maximized, and the imaging sensor device 1 including monochromatic pixels with a pixel pitch of 2.2 μm is used. Even in the high resolution mode, a monochromatic image is taken similarly to the global imaging mode, by arranging the imaging optical system and the sample at the best focus position.

When a multicolored image is necessary, RGB monochromatic images are taken three times by the previous method, and the image processor synthesizes these image portions into a multicolored image.

Similar to the global imaging mode, images are taken several times by shifting the sample position relative to the imaging sensor device and by moving the imaging center position of the optical system 310 so as to fill the spaces between imaging sensor devices. The image in the field of the optical system is obtained. A plurality of obtained images is synthesized through image processing, and the consecutive image in the field of the optical system 310 is obtained (see FIGS. 8A-8D). In the high resolution mode, an image may be taken only at a position (x, y) at which an observation of details are required, based on the images taken in the measurement or global imaging mode.

When only the global imaging mode is necessary, the high resolution mode can be omitted. In this case, the imaging apparatus may include only the imaging sensor devices 2 and 3. When only the high resolution mode is necessary, the global imaging mode may be omitted. In this case, the imaging apparatus may include only the imaging sensor devices 1 and 3.

The NA in the global imaging mode may be another NA. The imaging sensor device 2 may be replaced with a monochromatic imaging sensor device, and RGB monochromatic images may be taken three times to obtain a multicolored image.

Fourth Embodiment

Figure 10:
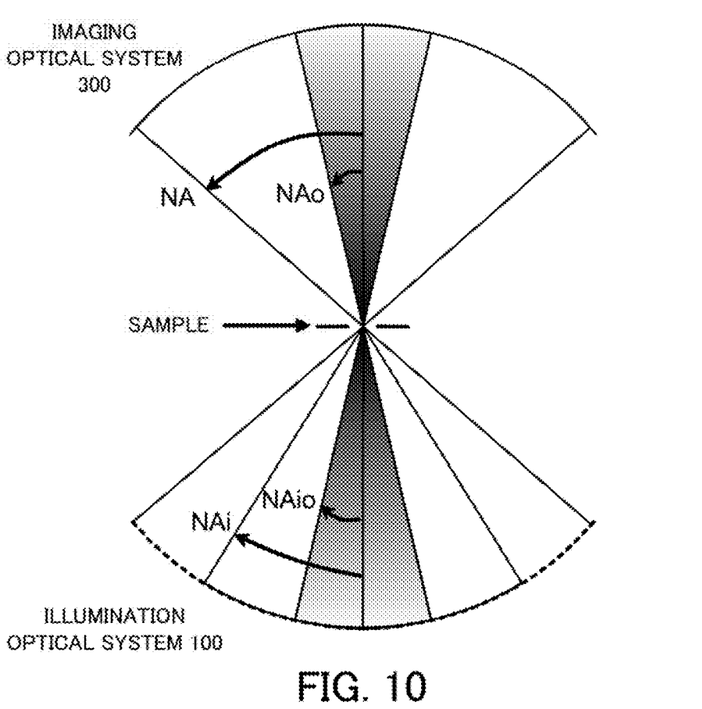
FIG. 10 is a view for explaining numerical apertures ("NAs") of the imaging optical system and the illumination optical system according to the fourth embodiment.

FIG. 10 is a view that enlarges a light flux of the illumination light used to illuminate the sample, and a light flux that has transmitted through the sample. In the imaging apparatus illuminated in FIG. 1, the light flux from the illumination optical system 100 is irradiated with the numerical aperture NAi, and enters the imaging optical system (objective lens) 300 with the numerical aperture NA. The NA ratio between them is referred to as σ.

When the objective lens uses a catadioptric optical system having a high NA in a wide area, a structure of an obscuration may be used in which light near the optical axis is not transmitted. Since this optical system 310 may absorb undesired scattered light in the optical path, the diaphragm 320 of the imaging optical system 300 uses a center blocking diaphragm. Assume that the numerical aperture of this light blocking portion is NAo.

The optical performance, such as a resolving power, a contrast, and a depth of focus, depends upon the relationship between a numerical aperture of the imaging optical system and a coherence factor (or a numerical aperture) of the illumination optical system 100. Thus, the diaphragm of the imaging optical system 300 and the diaphragm 130 of the illumination optical system 100 are important for a plurality of modes.

FIGS. 11A to 11F are plane views that illuminate a plurality of diaphragms 130 of the illumination optical system 100 and a plurality of diaphragms 320 of the imaging optical system 300. The plurality of diaphragms are different from each other in a distribution of the light transmitting portion and the light blocking portion. The imaging apparatus includes a means (not illustrated) configured to switch a plurality of diaphragms so that one of the plurality of diaphragms is located on the optical path.

A description will be given of a combination of the diaphragm 320 or 330 of the imaging optical system 300 and the diaphragm 130 of the illumination optical system in a certain imaging mode. FIGS. 13A to 13D illustrate representative shapes of the diaphragm of the imaging optical system 300, and FIGS. 12A to 12F illustrate representative shapes of the diaphragm of the illumination optical system 100.

Figure 12A:
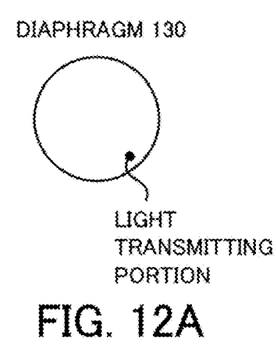
FIGS. 12A-12F are views for explaining diaphragms of the illumination optical system according to the fourth embodiment.
Figure 12B:
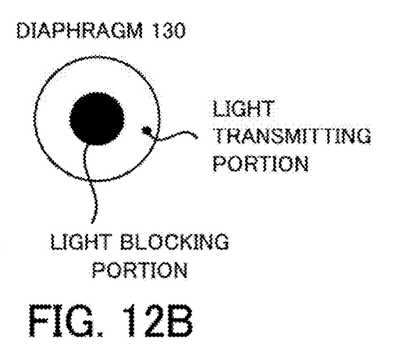
Figure 12C:
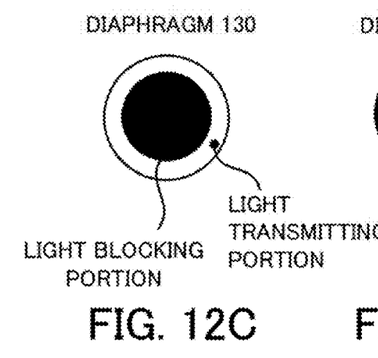
Figure 13A:
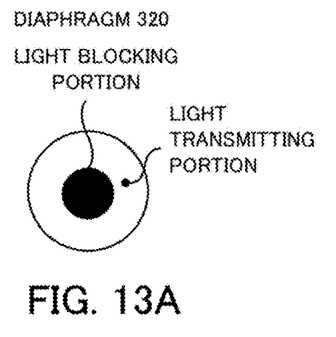
FIGS. 13A-13D are views for explaining diaphragms of the imaging optical system according to the fourth embodiment.
Figure 13B:
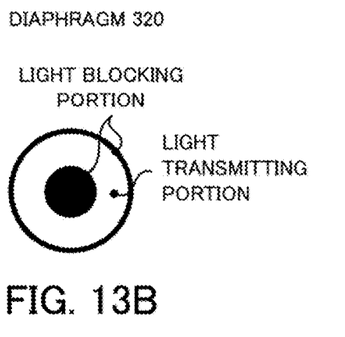
Figure 13C:
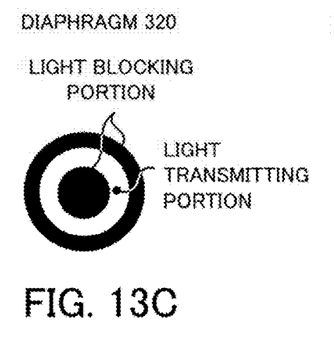
Figure 13D:
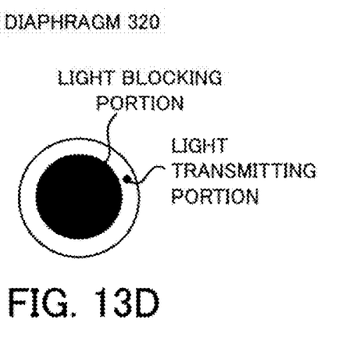

The center blocking diaphragm of the imaging optical system 300 has a transmittance distribution as illustrated in FIG. 13A. The illumination optical system 100 has a transmittance distribution that has no light blocking portion, as illustrated in FIG. 12A, when there is no diaphragm.

Figure 11A:
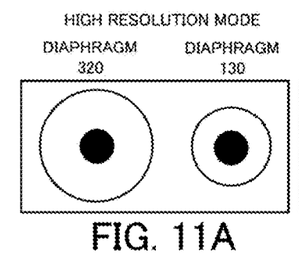
FIGS. 11A-11F are views for explaining the diaphragms of the imaging optical system and the illumination optical system according to the fourth embodiment.
Figure 11B:
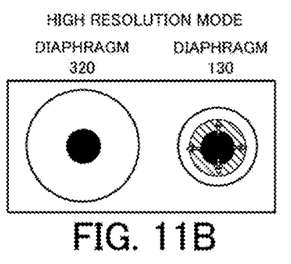

In the high resolution mode, the numerical aperture NA of the imaging optical system 300 is made larger, and the numerical aperture NAi of the illumination optical system 100 is made larger. Moreover, light blocking of the illumination optical system 100 is made larger than the numerical aperture NAo of the obscuration portion of the imaging optical system 300. Even in the illumination optical system 100, the annular illumination having an obscuration having the numerical aperture NAio≥NAo may be used (FIGS. 11A and 11B). In this case, the diaphragm 130 of the illumination optical system 100 is switched to the diaphragm illuminated in FIG. 12B or 12C.

Figure 11C:
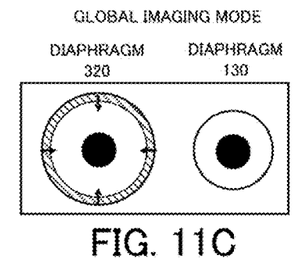

In the global imaging mode, the numerical aperture NA of the imaging optical system 300 is reduced by variable aperture stop 330, and the numerical aperture NAi of the illumination optical system 100 is made maximum, while σ is maintained smaller than 1. Moreover, the illumination optical system 100 is light-blocked with the numerical aperture NAo of the obscuration portion of the imaging optical system 300. In other words, even in the illumination optical system 100, the annular illumination having an obscuration having the numerical aperture NAio=NAo may be used (FIG. 11C).

Figure 12D:
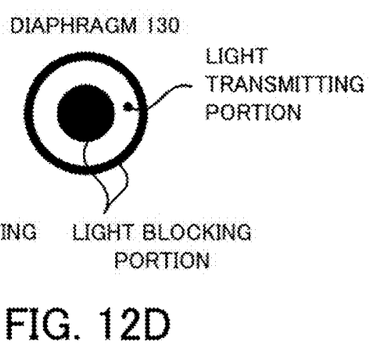
Figure 12E:
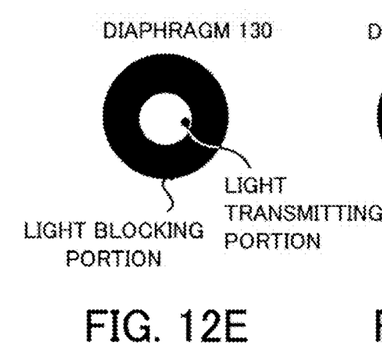
Figure 12F:
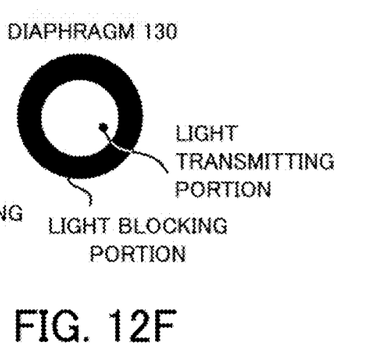

In this case, the numerical aperture of the imaging optical system 300 can be made smaller by reducing the variable aperture 210 of the imaging optical system 300. Alternatively, the diaphragm 320 of the imaging optical system 300 may use an aperture diaphragm having a transmittance distribution illuminated in FIG. 13B. The diaphragm 130 of the illumination optical system 100 uses a diaphragm illuminated in FIG. 12B. When σ (=NAi/NA)≥1 is set, the aperture of NAi is simultaneously reduced, as illustrated in FIG. 12D, and σ is set to 1.

Figure 11D:
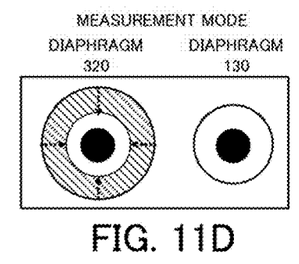

In the measurement mode, the numerical aperture NA of the imaging optical system 300 is further reduced by variable aperture stop 330, and the numerical aperture NAi of the illumination optical system 100 is maximized, but σ is maintained smaller than 1. Moreover, the illumination optical system 100 is light-shielded with the numerical aperture NAo of the obscuration portion of the imaging optical system 300. In other words, even the illumination optical system 100 utilizes an annular illumination having an obscuration of a numerical aperture NAio=NAo (FIG. 11D).

In this case, the numerical aperture of the imaging optical system 300 is reduced by further reducing the variable stop 210 of the imaging optical system 300. Alternatively, the diaphragm 320 of the imaging optical system 300 may have a diaphragm having a transmittance distribution illustrated in FIG. 13C. The diaphragm 130 of the illumination optical system 100 has a diaphragm illustrated in FIG. 12B. When σ(=NAi/NA)≥1 is satisfied, the aperture of NAi is simultaneously reduced as illustrated in FIG. 12D and σis set to 1.

Figure 11E:
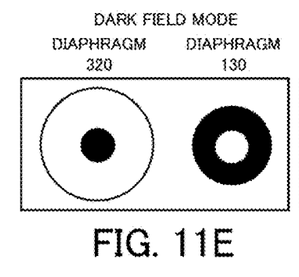

The imaging apparatus has a dark field (observation) mode as an option of the high resolution mode. In the dark field mode, the numerical aperture of the illumination optical system 100 is set to a value equal to or smaller than the numerical aperture NAo of the obscuration portion of the imaging optical system 300. In other words, the illumination optical system provides a circular illumination of the numerical aperture NAi≤NAo (FIG. 11E). In this case, the diaphragm 130 of the illumination optical system is replaced with a diaphragm illustrated in FIG. 12E.

Figure 11F:
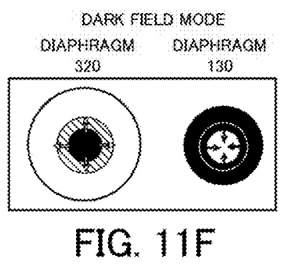

Moreover, the numerical aperture of the obscuration of the imaging optical system 300 may be made originally larger than the numerical aperture NAo of the obscuration portion of the optical system (FIG. 11F) by diaphragm 320. In this case, the numerical aperture of the obscuration portion illustrated in FIG. 13D of the diaphragm 320 of the imaging optical system 300 is made larger, and its light shielding portion is made larger. Since this configuration can make the circular illumination of the illumination optical system 100 larger, the diaphragm 130 of the illumination optical system 100 can be a diaphragm having a larger light transmitting portion as illustrated in FIG. 11F. As a result, a light quantity from the illumination optical system 100 can be increased.

The imaging apparatus includes the diaphragm 320 and the variable stop 330 of the imaging optical system 300, and further includes a driver configured to make variable the diaphragm shape of only the diaphragm 320 or the diaphragm shapes of the diaphragm 320 and the variable diaphragm 330. The imaging optical system 300 may fix the diaphragm 320 illustrated in FIG. 13A and make variable the variable diaphragm 330. The imaging optical system 300 may use a plurality of filters illustrated in FIGS. 13A-D for the diaphragm 320 exchangeably or switchably. The illumination optical system may use a plurality of filters illustrated in FIGS. 12B-F exchangeably or switchably.

While the present invention has been described with reference to exemplary embodiments, it is to be understood that the invention is not limited to the disclosed exemplary, embodiments. The scope of the following claims is to be accorded the broadest interpretation so as to encompass all such modifications and equivalent structures and functions.

This application claims the benefit of Japanese Patent Application No. 2011-060183, filed Mar. 18, 2011, which is hereby incorporated by reference herein in its entirety.

What is claimed is:

1. An imaging apparatus comprising:
   an illumination optical system configured to illuminate an object;
   an imaging optical system configured to form an optical image of the object;
   a first imaging sensor device;
   a second imaging sensor device with a smaller integration degree than that of the first imaging sensor device; and
   a controller,
   wherein each of the imaging optical system and the illumination optical system has a light blocking portion,
   wherein the controller is configured to:
      execute a first imaging mode in which the first imaging sensor device is used to take an image of the object while the first imaging sensor device is located at an image plane of the imaging optical system;
      execute a second imaging mode in which the second imaging sensor device is used to take an image of the object while the second imaging sensor device is located at the image plane of the imaging optical system; and
      change a numerical aperture of at least one of the imaging optical system or the illumination optical system by controlling the respective light blocking portion.

2. The imaging apparatus according to claim 1, further comprising a stage configured to position the first imaging sensor device on the image plane of the imaging optical system in the first imaging mode, and to position the second imaging sensor device on the image plane of the imaging optical system in the second imaging mode.

3. The imaging apparatus according to claim 1, wherein an image is taken after a numerical aperture of the imaging optical system in the second imaging mode is made smaller than that of the imaging optical system in the first imaging mode.

4. The imaging apparatus according to claim 1, wherein a numerical aperture of the light blocking portion in the illumination optical system is equal to or larger than that of the imaging optical system in the first imaging mode.

5. The imaging apparatus according to claim 1, wherein a numerical aperture of the light blocking portion in the illumination optical system is equal to that of the imaging optical system in the second imaging mode.

6. The imaging apparatus according to claim 1, wherein a numerical aperture of the light blocking portion in the imaging optical system is equal to or larger than that of a light transmitting portion in the illumination optical system in the first imaging mode.

7. The imaging apparatus according to claim 3, wherein:
   the imaging optical system includes a variable diaphragm, and
   the controller is further configured to change a numerical aperture of the imaging optical system by controlling the variable diaphragm.

8. The imaging apparatus according to claim 4, wherein the illumination optical system includes:
   a plurality of diaphragms, each of which has a different distribution of a light blocking portion; and
   a unit configured to change at least one of a numerical aperture of the illumination optical system or a numerical aperture of a light blocking portion in the illumination optical system by switching the plurality of diaphragms so that one of the plurality of diaphragms is arranged in an optical path.

9. The imaging apparatus according to claim 1, wherein the illumination optical system includes a filter configured to enable light that has transmitted the object, to selectively reach the first or second imaging sensor device.

10. The imaging apparatus according to claim 1, wherein the illumination optical system includes a color filter configured to enable light that has transmitted the object, to selectively reach the first or second imaging sensor device.

11. The imaging apparatus according to claim 1, further comprising:
    a movable stage configured to move the object in a plane perpendicular to an optical axis,
    wherein the controller is further configured to take images of the object a plurality of times by moving the object relative to the first or second imaging sensor device, to connect the images, and to form one image.

12. The imaging apparatus according to claim 1, wherein the imaging apparatus is a microscope.

13. An imaging apparatus comprising:
    an illumination optical system configured to illuminate an object;
    an imaging optical system configured to form an optical image of the object;
    a first imaging sensor device;
    a second imaging sensor device; and
    a controller,
    wherein each of the imaging optical system and the illumination optical system has a light blocking portion,
    wherein the controller is configured to:
       execute a first imaging mode in which the first imaging sensor device is used to take an image of the object while the first imaging sensor device is located at an image plane of the imaging optical system;
       execute a second imaging mode in which the second imaging sensor device is used to take an image of the object while the second imaging sensor device is located at the image plane of the imaging optical system; and
       change a numerical aperture of at least one of the imaging optical system or the illumination optical system by controlling the respective light blocking portion, and
    wherein a numerical aperture of the light blocking portion in the illumination optical system is equal to or larger than that of the imaging optical system in the first imaging mode.

14. The imaging apparatus according to claim 13, wherein:
the imaging optical system includes a variable diaphragm, and
the controller is further configured to change a numerical aperture of the imaging optical system by controlling the variable diaphragm.

\* \* \* \* \*